United States Patent
Halsey, IV et al.

(10) Patent No.: US 8,354,143 B2
(45) Date of Patent: Jan. 15, 2013

(54) CAPACITIVE TOUCH SCREEN AND METHOD OF MAKING SAME

(75) Inventors: Eugene L. Halsey, IV, Holland, MI (US); Mondher Cherif, Holland, MI (US)

(73) Assignee: TPK Touch Solutions Inc., Taipei (TW)

( * ) Notice: Subject to any disclaimer, the term of this patent is extended or adjusted under 35 U.S.C. 154(b) by 901 days.

(21) Appl. No.: 11/440,855

(22) Filed: May 25, 2006

(65) Prior Publication Data

US 2006/0266640 A1    Nov. 30, 2006

Related U.S. Application Data

(60) Provisional application No. 60/685,051, filed on May 26, 2005.

(51) Int. Cl.
*C23C 14/00* (2006.01)

(52) U.S. Cl. .......................... 427/372.2; 427/58

(58) Field of Classification Search ............ 204/192.29, 204/129.25; 427/58, 372.2, 487, 98.3, 404, 427/419.2, 419.3, 419.4
See application file for complete search history.

(56) References Cited

U.S. PATENT DOCUMENTS

| | | |
|---|---|---|
| 2,474,061 A | 6/1949 | Moulton |
| 2,584,905 A | 2/1952 | Moulton et al. |
| 2,655,452 A | 10/1953 | Barnes et al. |
| 2,680,205 A | 6/1954 | Burton |
| 2,782,676 A | 2/1957 | Osterberg |
| 3,094,436 A | 6/1963 | Schroder |
| 3,356,522 A | 12/1967 | Libbert |
| 3,415,706 A | 12/1968 | Ettre |
| 3,635,751 A | 1/1972 | Long, III et al. |
| 3,679,451 A | 7/1972 | Marks et al. |
| 3,811,918 A | 5/1974 | Levene |
| 4,161,547 A | 7/1979 | Kienel |
| 4,260,222 A | 4/1981 | Kozawa |
| 4,282,290 A | 8/1981 | Pellicori et al. |
| 4,289,822 A | 9/1981 | Shimada et al. |
| 4,346,131 A | 8/1982 | Yoldas |
| 4,361,598 A | 11/1982 | Yoldas |
| 4,446,171 A | 5/1984 | Thomas |
| 4,490,227 A | 12/1984 | Bitter |
| 4,535,026 A | 8/1985 | Yoldas et al. |
| 4,596,745 A | 6/1986 | Chao |
| 4,650,557 A | 3/1987 | Bitter |

(Continued)

OTHER PUBLICATIONS

E. Aperathitis et al, Solar Energy Materials and Solar Cells, 45(1997)161-168.*

*Primary Examiner* — Timothy Meeks
*Assistant Examiner* — Tabassom Tadayyon Eslami
(74) *Attorney, Agent, or Firm* — Gokalp Bayramoglu; Anna Tsang

(57) ABSTRACT

A capacitive touch screen and method of manufacturing such a touch screen includes providing a substrate and coating a surface of the substrate with a transparent conductive coating. An uncured conductive electrode material, such as an uncured silver epoxy material or an uncured silver or equivalent conducting metallic paste material, is disposed at least over a portion of the transparent conductive coating to establish a precursor of at least one metallic electrode at the substrate surface. A precursor of a protective hardcoat is established at least over the transparent conductive coating and/or the metallic electrode. Such precursor/undercured/uncured layers are then cured via a single common curing/firing process, which may heat the substrate and coatings to an elevated temperature, such as at about 500 degrees Celsius or above.

25 Claims, 2 Drawing Sheets

U.S. PATENT DOCUMENTS

| | | | |
|---|---|---|---|
| 4,652,467 A | 3/1987 | Brinker et al. | |
| 4,655,811 A | 4/1987 | Bitter | |
| 4,671,990 A | 6/1987 | Jada et al. | |
| 4,694,218 A | 9/1987 | Chao | |
| 4,824,712 A | 4/1989 | Falleroni et al. | |
| 4,830,879 A | 5/1989 | Debsikdar | |
| 4,864,084 A | 9/1989 | Cardinale | |
| 4,945,282 A | 7/1990 | Kawamura et al. | |
| 4,960,618 A | 10/1990 | Tanitsu et al. | |
| 4,965,096 A | 10/1990 | Deal et al. | |
| 4,996,083 A | 2/1991 | Moser et al. | |
| 5,011,732 A | 4/1991 | Takeuchi et al. | |
| 5,013,607 A | 5/1991 | Sato et al. | |
| 5,062,198 A | 11/1991 | Sun | |
| 5,108,479 A | 4/1992 | Hirano | |
| 5,123,940 A | 6/1992 | DiGiovanni et al. | |
| 5,137,560 A | 8/1992 | Ohmura et al. | |
| 5,137,749 A | 8/1992 | Yamazaki et al. | |
| 5,153,027 A | 10/1992 | Spagnoli | |
| 5,239,152 A | 8/1993 | Caldwell et al. | |
| 5,277,986 A | 1/1994 | Cronin et al. | |
| 5,291,097 A | 3/1994 | Kawamura et al. | |
| 5,519,282 A | 5/1996 | Takizawa et al. | |
| 5,525,264 A | 6/1996 | Cronin et al. | |
| 5,538,905 A | 7/1996 | Nishioka et al. | |
| 5,599,579 A | 2/1997 | Iwasaki | |
| 5,604,626 A | 2/1997 | Teowee et al. | |
| 5,725,957 A | 3/1998 | Varaprasad et al. | |
| 5,729,379 A | 3/1998 | Allemand et al. | |
| 5,742,118 A | 4/1998 | Endo et al. | |
| 5,770,258 A | 6/1998 | Takizawa et al. | |
| 5,789,854 A | 8/1998 | Takizawa et al. | |
| 5,838,483 A | 11/1998 | Teowee et al. | |
| 5,880,557 A | 3/1999 | Endo et al. | |
| 5,900,275 A | 5/1999 | Cronin et al. | |
| 6,001,486 A | 12/1999 | Varaprasad et al. | |
| 6,087,012 A | 7/2000 | Varaprasad et al. | |
| 6,114,645 A | 9/2000 | Burgess | |
| 6,218,679 B1 | 4/2001 | Takahara et al. | |
| 6,261,700 B1 | 7/2001 | Olson et al. | |
| 6,362,414 B1 | 3/2002 | Fujisawa et al. | |
| 6,380,480 B1 | 4/2002 | Norimatsu et al. | |
| 6,380,497 B1 | 4/2002 | Hashimoto et al. | |
| 6,395,863 B2 | 5/2002 | Geaghan | |
| 6,440,491 B1 | 8/2002 | Varaprasad et al. | |
| 6,488,981 B1 | 12/2002 | Richter et al. | |
| 6,549,193 B1 | 4/2003 | Huang et al. | |
| 6,620,454 B2 | 9/2003 | Varaprasad et al. | |
| 6,627,918 B2 | 9/2003 | Getz et al. | |
| 6,628,268 B1 * | 9/2003 | Harada et al. | 345/173 |
| 6,706,552 B2 | 3/2004 | Getz et al. | |
| 6,727,895 B2 * | 4/2004 | Bottari et al. | 345/174 |
| 6,787,240 B2 | 9/2004 | Getz | |
| 6,842,171 B2 | 1/2005 | Richter et al. | |
| 7,165,323 B2 | 1/2007 | Halsey, IV et al. | |
| 2002/0031622 A1 | 3/2002 | Ippel et al. | |
| 2002/0086188 A1 | 7/2002 | Halsey, IV et al. | |
| 2002/0197455 A1 * | 12/2002 | Richter et al. | 428/209 |
| 2004/0218511 A1 * | 11/2004 | Kondo et al. | 369/288 |
| 2005/0025981 A1 * | 2/2005 | Getz | 428/426 |
| 2006/0078691 A1 | 4/2006 | Cherif et al. | |

\* cited by examiner

CAPACITIVE TOUCH SCREEN AND METHOD OF MAKING SAME

CROSS REFERENCE TO RELATED APPLICATION

The present application claims benefit of U.S. provisional application, Ser. No. 60/685,051, filed May 26, 2005, which is hereby incorporated herein by reference in its entirety.

FIELD OF THE INVENTION

The present invention relates generally to touch screens and, more particularly, to capacitive touch screens and methods for manufacturing capacitive touch screens.

BACKGROUND OF THE INVENTION

As the use of touch screens, such as for public information kiosks, portable devices, and gaming applications and the like, increases, so does the need for efficient processes for manufacturing reliable touch screens. Typically, touch screens, and in particular capacitive touch screens, are manufactured via a multi-step process that includes multiple high temperature curing stages. For example, a touch screen may be manufactured by first washing a piece of flat glass, screen masking the glass surface where no conductive coating is desired and coating the glass surface with a transparent conductive coating, such as antimony tin oxide (ATO). The transparent conductive coating is then often fired at a high temperature of about 510 degrees Celsius or higher to improve properties thereof. The coated glass substrate is then washed and a conductive electrode, such as a silver conductive epoxy or paste portion, is printed onto the surface and then this is cured at a high temperature, such as about 480 degrees Celsius or higher. The glass is washed again and a hardcoat layer (such as an inorganic oxide, such as silicon dioxide) may be coated, such as by spraying, onto the glass, or the glass may be dipped into a precursor solution of the hardcoat coating. The hardcoat is then cured at a high temperature, such as about 520 degrees Celsius or thereabouts. A protective border layer may then be screened over the silver and may then be cured, such as via an ultraviolet (UV) curing process or, where a glass frit may be used, via another high temperature firing process. The glass is then cut to its final size and the edges are seamed before the touch screen is washed and packaged for shipping. The conductive coating is preferably antimony tin oxide due to the stability and uniformity of ATO during the multiple heat curing processes. Examples of such coatings and sensors or touch screens are described in U.S. Pat. Nos. 6,488,981; 6,549,193; 6,727,895; and 6,842,171, which are hereby incorporated herein by reference in their entireties.

Although it has been proposed to form a transparent conductive layer or coating of an indium tin oxide (ITO) material, commercial success of such a touch screen has been limited due to the difficulties in achieving substantially uniform resistivity of the conductive coating across the sheet. Also, because ITO has the propensity to reduce or change its electrical properties when exposed to high temperatures as formed, such a coating has heretofore been not preferred for use in such touch screen applications that require multiple high temperature firings. Also, due to the higher specific conductivity of ITO relative to ATO, a substantially thinner coating of ITO is needed to achieve the resistance desired for such touch screens or panels. If the ITO coating is degraded to have a reduced conductivity, uniformity concerns with the material arise.

SUMMARY OF THE INVENTION

The present invention provides a touch screen with a transparent conductive coating and a method of manufacturing such a touch screen. The transparent conductive coating is applied as a indium tin composition (such as an In/Sn/suboxide) and provides enhanced and substantially uniform conductivity across the substrate of the touch screen. The transparent conductive coating and any other coatings or elements, such as conductive silver electrodes and a protective hardcoat, may be cured via a common unitary curing/firing process, such that the substrate and coatings are exposed to a single curing process, such as a single high temperature curing process or the like.

According to an aspect of the present invention, a method of manufacturing a touch screen includes providing a substrate and coating a surface of the substrate with a transparent conductive coating. Then, an uncured conductive electrode material, such as an uncured silver epoxy material or an uncured silver or equivalent conducting metallic paste material, is disposed at least over a portion of the transparent conductive coating to establish a precursor of at least one metallic electrode at the substrate surface. Then, a precursor of a protective hardcoat is established at least over the transparent conductive coating and/or the metallic electrode. Such precursor/undercured/uncured layers are then cured via a single common curing/firing process, which may heat the substrate and coatings to an elevated temperature, such as at about 500 degrees Celsius or above.

The transparent conductive coating may comprise an indium tin composition, and may be applied in a sputter chamber having an atmosphere with reduced oxygen content, while depositing onto a relatively unheated substrate (such as a substrate typically less than about 100 degrees Celsius).

Therefore, the present invention provides a method for forming a multi-layer touch screen that has a substantially uniform transparent conductive coating and that is formed with a single or common or unitary curing or firing process, such that a separate curing/firing process for each coating is not required. The ITO-type coating may provide enhanced conductive properties over conventional ATO coatings, and may provide substantially uniform conductivity over the substrate surface.

These and other objects, advantages, purposes and features of the present invention will become apparent upon review of the following specification in conjunction with the drawings.

DESCRIPTION OF THE PREFERRED EMBODIMENTS

Figure 1:
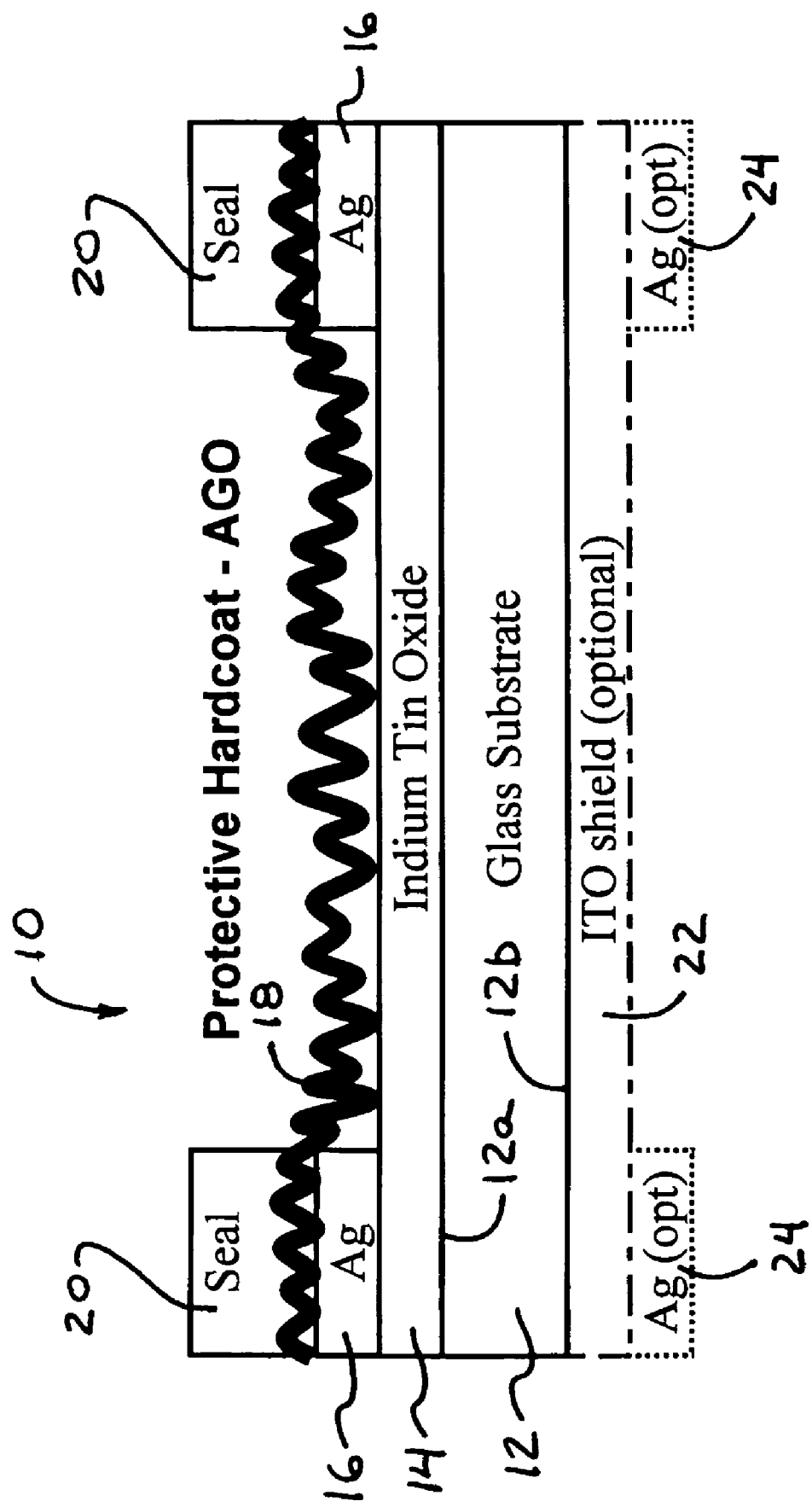
FIG. 1 is a sectional view of a capacitive touch screen in accordance with the present invention.

Referring now to the drawings and the illustrative embodiments depicted therein, a capacitive touch screen 10 in accordance with the present invention is shown in FIG. 1. Touch screen 10 includes a transparent rigid substrate 12, which can be glass, such as soda-lime glass, or a polymeric, acrylic or plastic material or the like, most preferred a transparent plastic cyclic olefin copolymer (such as described in U.S. patent application Ser. No. 09/946,228, filed Sep. 5, 2001 by Ippel et al. for IMPROVED PLASTIC SUBSTRATE FOR INFORMATION DEVICES AND METHOD FOR MAKING SAME, A transparent conductive or semi-conductive thin film 14 (such as an indium tin composition or an indium tin oxide or the like) is established or deposited, such as by sputtering or the like, onto a surface 12a of substrate 12. One or more conductive coatings or electrodes 16, such as a metallic or silver frit or paste or epoxy or the like, is/are established over one or more portions of the conductive coating 14, such as at perimeter portions of the substrate, in order to establish an edge pattern of electrodes on the substrate. Touch screen 10 also includes a protective hardcoat or layer 18 over the conductive coating or layer 14. A seal 20 may be established around the perimeter region of the substrate.

During use of the manufactured touch screen, a user may touch the outer surface of hardcoat 18, whereby the user's finger capacitively couples with the touch screen so that there is a small voltage drop or change across the touch screen, such as is known in the capacitive touch screen arts. The touch screen is connected to circuitry that measures the impedance at the corners or edges of the touch screen (such as via electrical connection to the metallic frit or portions or electrodes 16) to determine the drop or change in voltage or ratio of voltage drops at the electrodes and thereby determine the location of the finger that is capacitively coupled or touching the touch screen.

Optionally, the capacitive touch screen 10 may include an ultrathin glass substrate (not shown), which may have an anti-glare coating or diffuser surface coating applied to or deposited on an outer surface of the substrate, such as described in U.S. patent application Ser. No. 10/710,164, Now U.S. Pat. No. 7,165,323 filed Jun. 23, 2004 by Halsey et al. for HIGH DURABILITY TOUCH SCREEN AND METHOD FOR MANUFACTURING, and/or U.S. provisional application, Ser. No. 60/484,713, filed Jul. 3, 2003 by Halsey et al. for HIGH DURABILITY TOUCH SCREEN AND METHOD FOR MANUFACTURING, which are hereby incorporated herein by reference in their entireties.

Optionally, and as shown in FIG. 1, the touch screen may also include a conductive coating 22 established at the rear surface 12b of the substrate 12, with a metallic coating or layer 24, such as a silver frit or the like, established at a perimeter region or regions of the rear surface of the conductive coating 22. The back side shield coating may comprise a half wave ITO, a conductive anti-reflective TO coating, a high ohm ITO coating or other suitable coating or coatings. The conductive coating at the rear surface preferably has a resistance of less than about 300 ohms, and more preferably less than about 100 ohms (but could have more or less resistance). The conductive coating may be established by physical vapor deposition (PVD) or chemical vapor deposition (CVD) or the like, while remaining within the spirit and scope of the present invention.

The present invention encompasses application deposition of a transparent conductive coating (such as indium tin or indium tin oxide, or doped tin oxide or the like), preferably in a vacuum environment, and achievement of further processing, such as heating, to fully form transparent conductive thin film. The touch screen may be made utilizing aspects of the touch screens and methods described in U.S. patent application Ser. No. 10/710,164, Now U.S. Pat. No. 7,165,323 filed Jun. 23, 2004 by Halsey et al. for HIGH DURABILITY TOUCH SCREEN AND METHOD FOR MANUFACTURING; and/or Ser. No. 11/218,374, filed Sep. 2, 2005 by Cherif et al. for DISPLAY SUBSTRATE WITH DIFFUSER COATING; and/or U.S. provisional applications, Ser. No. 60/484,713, filed Jul. 3, 2003 by Halsey et al. for HIGH DURABILITY TOUCH SCREEN AND METHOD FOR MANUFACTURING; and/or Ser. No. 60/607,332, filed Sep. 3, 2004 by Cherif et al. for DISPLAY SUBSTRATE WITH DIFFUSER COATING, which are all hereby incorporated herein by reference in their entireties. Optionally, whether in the same vacuum deposition step or before or after the deposition step, anti-reflection coatings can be deposited if desired (such as described in U.S. patent application Ser. No. 09/883,654, filed Jun. 18, 2001 by Getz for ENHANCED LIGHT TRANSMISSION CONDUCTIVE COATED TRANSPARENT SUBSTRATE AND METHOD FOR MAKING SAME, now U.S. Pat. No. 6,787,240, which is hereby incorporated herein by reference in its entirety). Further, either before or after either or both of the above operations, one or more anti-glare coatings (AGC) or diffuser surface coatings can be deposited such as by wet chemical deposition (such as disclosed in U.S. Pat. Nos. 5,725,957; 6,001,486; 6,087,012; and 6,440,491, which are hereby incorporated herein by reference in their entireties. The coatings may be sputter coated or deposited, or may be established via an ultrasonic coating process, such as described in U.S. patent application Ser. No. 11/218,374, filed Sep. 2, 2005 by Cherif et al. for DISPLAY SUBSTRATE WITH DIFFUSER COATING, and/or U.S. provisional application, Ser. No. 60/607,332, filed Sep. 3, 2004 by Cherif et al. for DISPLAY SUBSTRATE WITH DIFFUSER COATING, which are hereby incorporated herein by reference in their entireties.

The capacitive touch screen is formed with a substantially transparent conductive coating, such as an indium tin coating, on its front surface and is cured by a single high temperature curing process that cures both the conductive coating and the metallic or silver electrodes or border portions, such that multiple high temperature curing processes are not required. The conductive coating may comprise an indium tin coating that is sputter deposited in a limited oxygen environment so that the conductive or indium tin oxide type coating is rich in indium tin at that stage. The conductive coating may be heated to a high temperature in the reduced atmosphere and may be deposited on the substrate while the substrate is substantially non-heated or generally at room temperature (such as a substrate that is at a temperature of less than about 100 degrees Celsius). The conductive coating material or composition thus may be rich in metal (such as rich in indium tin) and may have a reduced oxygen content as it is deposited or established onto the substrate surface. When deposited on the substrate surface, the indium tin coating may be tinted or colored (such as a brownish color or other color or tint) and may have a transmissivity of light incident thereon of about 35 percent to about 45 percent or thereabouts. The coating process and coating material may utilize principles of the coating processes described in U.S. Pat. Nos. 4,650,557; 4,490,227; and 4,655,811, which are hereby incorporated herein by reference in their entireties.

The coating and curing process of the present invention allows for use of a thin indium tin layer on the substrate surface. Prior touch screens did not use such a thin indium tin or ITO layer for capacitive sensor since the high temperature curing processes cause the ITO resistance to shift and lose uniformity. The desired or appropriate oxygen level and deposition conditions in the coating chamber allow the single cure process of the present invention to establish and cure a thin indium tin or ITO-type conductive composition or layer onto the substrate surface while also providing substantially uniform conductivity across the substrate surface. The present invention thus provides a touch screen that utilizes the superior electrical conductivity characteristics of an indium tin or ITO-type coating while providing a substantially uniform, substantially transparent, conductive coating over the surface of the substrate of the touch screen or sensor.

Preferably, the sheet resistance of the conductive coating is at least about 400 ohms per square (but could be lower), more preferably at least about 800 ohms per square and more preferably at least about 1200 ohms per square. Also, the sheet resistance of the conductive coating is preferably less than approximately 8000 ohms per square, more preferably less than about 6000 ohms per square and more preferably less than about 4000 ohms per square. The desired range of resistance provides a desired resolution for the touch screen, while being able to process the data via economical electronic circuitry, such as an 8 or 12 or 16 bit processor (or larger processors or circuitry, such as 32 bit or 64 bit or 256 bit or the like if desired). The circuitry or microprocessor may be connected to or include an analog to digital (A/D) converter to convert the data sampled from the capacitive sensor or touch screen to a digital format for processing by the processing circuitry.

The process of the present invention thus coats and forms a substrate for a capacitive touch screen via a process that includes a single high temperature curing or firing stage and that provides a substantially uniform coating of a conductive indium tin composition or ITO-type coating on the substrate surface. The process includes washing the glass substrate, screening a mask onto the substrate surface where the conductive coating is not desired, coating the transparent conductive coating material onto the non-heated substrate surface, screening an uncured metallic or silver frit material or silver paste or epoxy or the like on portions of the uncured conductive coating and spraying an uncured hardcoat material or layer over the uncured transparent conductive coating and/or the uncured silver frit or epoxy or paste material. The substrate and coatings may all be substantially simultaneously cured or fired at a high temperature (such as about 520 to about 540 degrees Celsius), and may be cured or fired in the presence of nitrogen. Optionally, a protective border may be screened over the electrodes or frit layers silver and the protective border may be cured (such as via a UV curing process or a high temperature curing process or the like). The glass substrate is then cut to its final size and shape and the edges are seamed prior to washing and packing the completed touch screen substrate.

Figure 2:
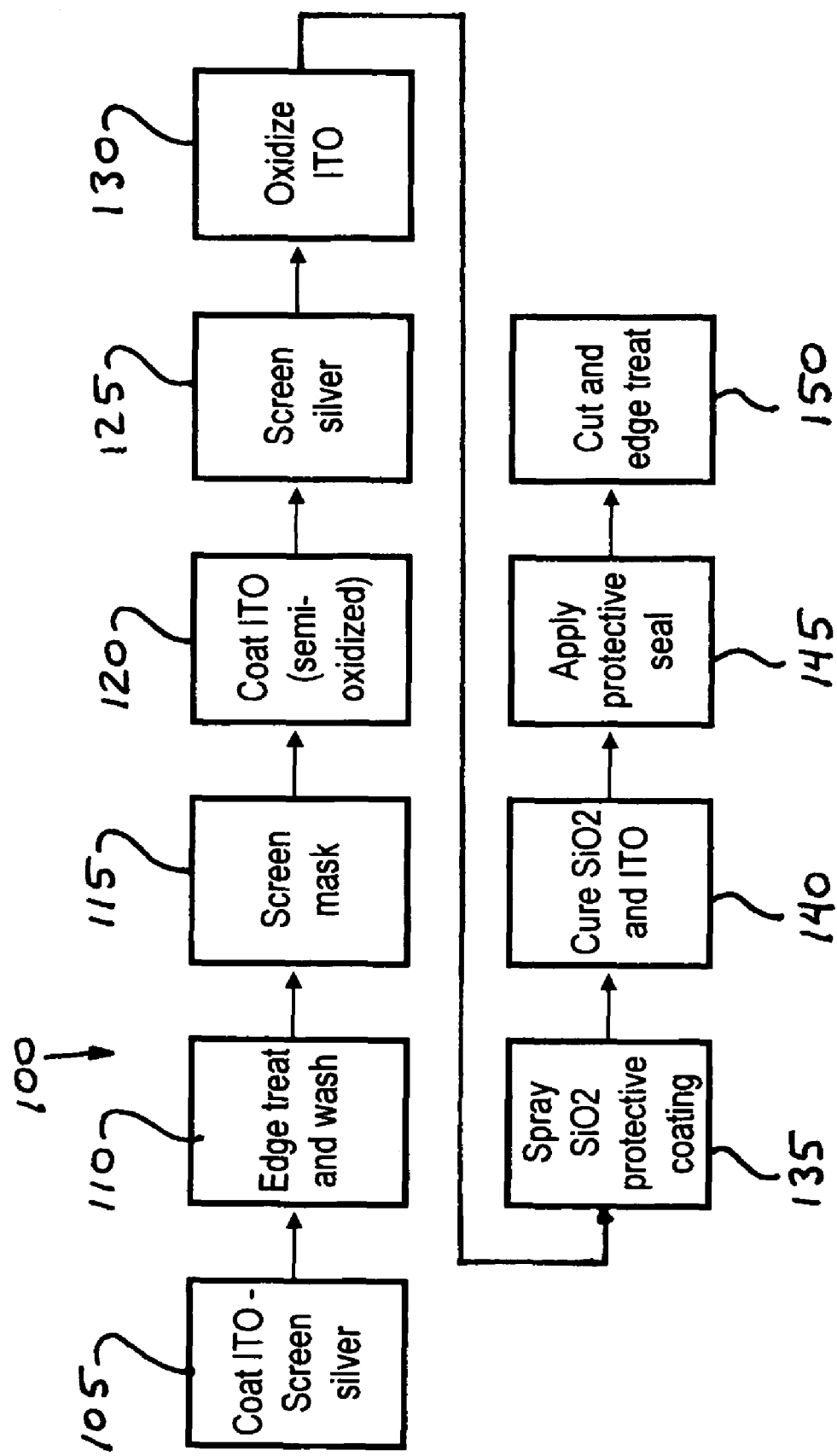
FIG. 2 is a block diagram of the process of manufacturing the touch screen of the present invention.

Referring now to FIG. 2, a process 100 for forming or manufacturing a touch screen of the present invention starts at 105, where, optionally, such as for touch screens that may require a back shield or the like, a transparent conductive coating (such as an ITO or the like) may be coated to the second or rear or back side or surface of the glass substrate, and a silver pattern may be screened on and cured at a high temperature. The sheet resistance of the transparent conductive coating may range from about 10 ohms per square to about 1000 ohms per square (or more or less). The transparent conductive coating may comprise a half wave ITO coating or ITO coating or TO coating or other suitable coating/coatings that provides enhanced transmission with good conductivity (such as about 10 to 20 ohms per square or thereabouts). The coating/coatings may be established via physical vapor deposition (PVD) or chemical vapor deposition (CVD) or the like, while remaining within the spirit and scope of the present invention. The conductive coating 22 and metallic coating 24 thus may be established at the rear surface of the substrate before the common firing/curing process for the front or first surface precursors/coatings discussed below.

The glass substrate is treated and washed at 110, where a radius seam or the like may be established on the edge of the glass and where the glass may be washed, such as via any known washing process, such as via a mechanical brush washer or the like, so as to prepare the front substrate surface for coating. A mask is screened over the first or front substrate surface at 115 and at the areas where the front substantially transparent conductive coating is not desired. The transparent conductive coating material or composition is then coated or deposited or established onto the masked front substrate surface at 120. The coating process is performed on the substrate surface with the substrate at a non-heated state or generally at room temperature. The uncured coating material may comprise an indium tin rich metallic composition or a semi-oxidized indium tin metal that is coated over the protective mask and onto the front glass surface. The oxygen content of the indium tin is preferably between about thirty percent and fifty-five percent, and more preferably between about forty percent and about forty-five percent. The preferred oxygen content may obviate post oxidation and may provide enhanced stability of the conductive coating.

After the conductive coating material is established on the glass surface, an uncured conductive or metallic material (such as silver frit or paste or epoxy or other metallic or conductive material) is established or applied over portions of the uncured conductive coating at 125 to establish a precursor to the edge electrodes and wire traces. The uncured conductive electrode material may be established via a screen printing process (or via other coating or establishing processes, such as via an ink jet or a robotic CNC or the like). The uncured conductive electrode material may comprise silver or other metals and may comprise a frit material or composition having metal particles and glass particles or other suitable material, such as a silver epoxy or silver paste or the like. Optionally, the uncured transparent conductive coating may be oxidized at 130, where an initial oxidation step is applied to the mask, the uncured conductive electrode material and the uncured transparent conductive coating, and where the initial oxidation step removes the mask, sets the uncured conductive electrode material and gives the uncured transparent conductive coating an initial electrical characteristic. The oxidation process may include heating the substrate and coatings/materials at an elevated or high temperature, such as at about 420 degrees Celsius to about 480 degrees Celsius or thereabouts (or at a higher or lower temperature), for a selected period of time, such as about twenty to about forty minutes or thereabouts. Optionally, this step may be consolidated into a single curing step for curing the conductive coating and the protective coating, as discussed below.

A protective and/or anti-glare hardcoat material may be applied to the substrate at 135. The hardcoat may comprise a silicon oxide ($SiO_2$) or other suitable anti-glare hardcoat material, and may be sprayed onto the oxidized and/or uncured transparent conductive coating and the uncured conductive electrode material. The uncured hardcoat material may consist primarily of silica particles that may be fired into either a silicon dioxide or silicon nitride matrix, thereby providing enhanced scratch and wear resistance to the completed touch screen. Optionally, the uncured hardcoat material may be sprayed onto the substrate using an ultrasonic spraying device, such as described in U.S. patent application Ser. No. 11/218,374, Now U.S. Pat. No. 7,507,438 filed Sep. 2, 2005 by Cherif et al. for DISPLAY SUBSTRATE WITH DIFFUSER COATING, and/or U.S. provisional application, Ser. No. 60/607,332, filed Sep. 3, 2004 by Cherif et al. for DISPLAY SUBSTRATE WITH DIFFUSER COATING, which are hereby incorporated herein by reference in their entireties, so as to provide a substantially continuous anti-glare hardcoat layer over the uncured conductive coating and the uncured conductive electrode material. Optionally, nano particles may be added to the hardcoat solution, thereby producing a range of other characteristics (such as enhanced scratch resistance, desired optical characteristics and the like).

After the uncured hardcoat material is applied, a high temperature curing or firing process is conducted at 140. The substrate, with the uncured transparent conductive coating and uncured electrode material and uncured hardcoat material applied thereto, may be heated or fired at a high temperature, such as at about 520 degrees Celsius to about 540 degrees Celsius, or between about 510 degrees Celsius to about 560 degrees Celsius or thereabouts. The cure time or firing time may be between about forty minutes and about sixty minutes, and could range from about fifteen minutes to about ninety minutes, depending on the cure/fire temperature and other characteristics/parameters of the coatings and processes. Desirably, the glass and uncured coating materials may be cured in a nitrogen rich atmosphere, so as to provide a derivative of silicon nitride, or may be cured in an oxygen rich atmosphere. The process or method of manufacturing a touch screen of the present invention thus cures the indium tin or ITO-type conductive coating material, the conductive electrode material and the hardcoat material via a single curing/firing process and provides a substantially uniform and substantially stable indium tin coating with a durable hardcoat.

A protective seal may be applied at 145, such as a seal having a thickness of about 25 to about 75 microns or thereabouts, and more preferably of about 35 microns or thereabouts. and may be cured, such as under mercury arc lamps at an intensity of about 1500 mJ/cm to about 2000 mJ/cm or thereabouts, and may be at an intensity as high as about 3000 mJ/cm or more, without impacting the performance of the touch screen. The seal may be applied via screen printing a UV curable dielectric material over the metallic electrodes on the front side of the touch screen or via other means, without affecting the scope of the present invention.

The glass is then cut and the edges are treated at 150. The glass may be processed at a larger size and then cut to its final size after the coating and curing/firing processes are completed. Once the glass is cut to the desired size and/or shape, a safety edge is applied (such as by seaming or pencil seaming the edge of the substrate) for safe handling of the glass substrate. The coated and seamed glass substrate or shape may be washed, inspected and packed for shipping and/or for further assembly or installation.

Optionally, multiple substrates may be coated and formed via the processes of the present invention, whereby multiple touch screens or sensors are formed in a "multi-up" process. The multiple touch screens or sensors may be cut via any known cutting means to form the touch screens or sensors in the desired shape and size. Optionally, the substrate may be cut to the desired size and shape before the coating and curing processes. Optionally, a single substrate may be coated and formed via the process of the present invention, whereby the substrate may be cut to the desired size and shape either before or after the coating and curing/firing processes.

Therefore, a capacitive sensor or touch screen of the present invention may be formed with a single curing/firing step that cures (fires) the conductive or silver electrode material, the transparent conductive coating material, and the hardcoat material. Optionally, the high temperature curing process may introduce nitrogen into the curing chamber to form a silicon nitride layer, which is harder than silicon dioxide. The touch screen or sensor could be produced with first surface (i.e. the surface touched by a human finger or object) electrical sheet resistance in range of about 600 ohms per square to about 1800 ohms per square or thereabouts (or more or less). The present invention thus provides an enhanced manufacturing process over conventional manufacturing processes, which rely on multiple, separate heating or curing steps to cure the antimony or ATO layer, to cure the metallic or silver electrodes, and to cure the hardcoat. An indium tin oxide (ITO) transparent conductive layer is typically not preferred for such processes, since the ITO layer is typically not stable enough to withstand the multiple high temperature heating processes.

Changes and modifications in the specifically described embodiments may be carried out without departing from the principles of the present invention, which is intended to be limited only by the scope of the appended claims, as interpreted according to the principles of patent law.

The invention claimed is:

1. A method of manufacturing a touch screen, said method comprising:
   providing a substrate;
   coating by sputtering in a sputter chamber an unheated surface of said substrate with an uncured conductive coating, said uncured conductive coating comprising an indium/tin/suboxide thin film coating;
   disposing at said unheated substrate surface an uncured conductive paste material at least over a portion of said uncured conductive coating to establish a precursor of at least one conductive electrode at said substrate surface;
   disposing at said unheated substrate surface an uncured hardcoat material over at least one of said uncured conductive coating and said uncured conductive paste material to establish a precursor of a protective hardcoat at least over at least one of said uncured conductive coating and said uncured conductive paste material;
   commonly heat curing said uncured hardcoat material, said uncured conductive coating and said uncured conductive paste material via a common thermal curing and firing process in a nitrogen rich atmosphere;
   wherein said indium/tin/suboxide thin film coating is transformed during said common thermal curing and firing process to a cured indium tin oxide transparent conductive coating suitable for use for a touch screen, and wherein said cured indium tin oxide transparent conductive coating has a sheet resistance of less than about 8000 ohms per square;
   wherein said uncured conductive paste material is transformed during said common thermal curing and firing process to at least one cured conductive electrode suitable for use for a touch screen; and
   wherein said uncured hardcoat material is transformed during said common thermal curing and firing process to a cured protective hardcoat suitable for use for a touch screen.

2. The method of claim 1, wherein curing said uncured hardcoat material, said uncured conductive coating and said uncured conductive paste material via a common curing and firing process comprises curing by heating said substrate, said uncured hardcoat material, said uncured conductive coating and said uncured conductive paste material to an elevated temperature via a common curing and firing process.

3. The method of claim 2, wherein said elevated temperature is at least about 500 degrees Celsius.

4. The method of claim 1, wherein coating a surface of said substrate with an uncured conductive coating comprises depositing said uncured transparent conductive coating onto a substrate having a temperature of less than about 100 degrees Celsius.

5. The method of claim 1, wherein coating a surface of said substrate with an uncured conductive coating comprises coating a first surface of said substrate with an uncured conducive coating, said method including coating a second surface of said substrate with a second transparent conductive coating, said second surface being opposite said first surface.

6. The method of claim 5 including establishing a conductive coating at a perimeter region of said second surface transparent conductive coating.

7. The method of claim 1, wherein an oxygen content of indium tin is between about thirty percent and about fifty-five percent.

8. The method of claim 1, wherein said uncured conductive coating comprising an indium/tin/suboxide thin film coating has a transmissivity of light incident thereon of less than about forty-five percent.

9. The method of claim 1, wherein said cured indium tin oxide transparent conductive coating has a sheet resistance of at least about 400 ohms per square and wherein said touch screen comprises a capacitive touch screen.

10. A method of manufacturing a touch screen, said method comprising:
   providing a substrate;
   sputter coating an unheated surface of said substrate with an uncured conductive coating comprising an indium/tin/suboxide thin film coating;
   wherein said sputter coating comprises sputter coating an unheated surface of said substrate with an uncured conductive coating via sputter coating in a sputter chamber;
   disposing at said unheated substrate surface an uncured conductive paste material at least over a portion of said uncured conductive coating to establish a precursor of at least one conductive electrode at said substrate surface, wherein said uncured conductive paste material comprises an uncured silver epoxy material;
   disposing at said unheated substrate surface an uncured hardcoat material over at least one of said uncured conductive coating and said uncured conductive paste material to establish a precursor of a protective hardcoat at least over at least one of said uncured transparent conductive coating and said uncured conductive paste material;
   commonly heat curing said uncured hardcoat material, said uncured conductive coating and said uncured conductive paste material via a common thermal curing and firing process in a nitrogen rich atmosphere;
   wherein said indium/tin/suboxide thin film coating is transformed during said common thermal curing and firing process to a cured indium tin oxide transparent conductive coating suitable for use for a touch screen, and wherein said cured indium tin oxide transparent conductive coating has a sheet resistance of less than about 8000 ohms per square;
   wherein said uncured conductive paste material is transformed during said common thermal curing and firing process to at least one cured conductive electrode suitable for use for a touch screen; and
   wherein said uncured hardcoat material is transformed during said common thermal curing and firing process to a cured protective hardcoat suitable for use for a touch screen.

11. The method of claim 10, wherein curing said hardcoat material, said uncured conductive coating and said uncured conductive paste material via a common curing and firing process comprises curing by heating said substrate, said uncured hardcoat, said uncured conductive coating and said uncured conductive paste material to an elevated temperature via a common curing and firing process, wherein said elevated temperature is at least about 500 degrees Celsius.

12. The method of claim 10, wherein sputter coating an unheated surface of said substrate with an uncured conductive coating comprises depositing said uncured conductive coating onto a substrate having a temperature of less than about 100 degrees Celsius.

13. The method of claim 10, wherein sputter coating a surface of said substrate with an uncured conductive coating comprises sputter coating a first surface of said substrate with an uncured conductive coating, said method including coating a second surface of said substrate with a second surface transparent conductive coating, said second surface being opposite said first surface.

14. The method of claim 13 including establishing a conductive coating at a perimeter region of said second surface transparent conductive coating.

15. The method of claim 10, wherein an oxygen content of indium tin is between about thirty percent and about fifty-five percent.

16. The method of claim 10, wherein said uncured conductive coating comprising an indium/tin/suboxide thin film coating has a transmissivity of light incident thereon of less than about forty-five percent.

17. A method of manufacturing a touch screen, said method comprising:
   providing a substrate;
   coating an unheated first surface of said substrate with a first uncured conductive coating, said first uncured conductive coating comprising an indium/tin/suboxide thin film coating:
   wherein coating an unheated first surface of said substrate comprises coating an unheated first surface of said substrate with a first uncured conductive coating via sputter coating in sputter chamber;
   disposing at said unheated substrate surface an uncured conductive material at least over a portion of said uncured conductive coating to establish a precursor of at least one electrode at said first surface of said substrate;
   disposing at said unheated substrate surface an uncured hardcoat material over at least one of said first uncured conductive coating and said uncured conductive material to establish a precursor of protective hardcoat at least over at least one of said uncured conductive coating and said uncured conductive material;
   coating a second surface of said substrate with a second uncured conductive coating;
   commonly heat curing said uncured hardcoat material, said first uncured transparent conductive coating and said uncured conductive material via a common thermal curing and firing process in a nitrogen rich atmosphere;
   wherein said indium/tin/suboxide thin film coating is transformed during said common thermal curing and firing process to a cured indium tin oxide transparent conductive coating suitable for use for a touch screen, and wherein said cured indium tin oxide transparent conductive coating has sheet resistance of at least about 400 ohms per square and less than about 8000 ohms per square;
   wherein said uncured conductive material is transformed during said common thermal curing and firing process to at least one cured electrode suitable for use for a touch screen; and
   wherein said uncured hardcoat material is transformed during said common thermal curing and firing process to a cured protective hardcoat suitable for use for a touch screen.

18. The method of claim 17, wherein curing said uncured hardcoat material, said first uncured conductive coating and said uncured conductive material via a common curing and firing process comprises curing by heating said substrate, said uncured hardcoat material, said first uncured conductive coating and said uncured conductive material to an elevated temperature via a common curing and firing process.

19. The method of claim 17, wherein coating a first surface of said substrate with a first uncured conductive coating comprises depositing said first uncured conductive coating onto a substrate having a temperature of less than about 100 degrees Celsius.

20. The method of claim 17, wherein an oxygen content of indium tin is between about thirty percent and about fifty-five percent.

21. The method of claim 17, wherein said uncured conductive coating comprising an indium/tin/suboxide thin film coating has transmissivity of light incident thereon of less than about forty-five percent.

22. A method of manufacturing a touch screen, said method comprising:
   providing a substrate;
   coating by sputtering in a sputter chamber an unheated surface of said substrate with an uncured conductive coating, said uncured conductive coating comprising an indium/tin/suboxide thin film coating;
   disposing at said unheated substrate surface an uncured conductive paste material at least over a portion of said uncured conductive coating to establish a precursor of at least one conductive electrode at said substrate surface;
   commonly heat curing said uncured conductive coating and said uncured conductive paste material via a common thermal curing and firing process;
   wherein, said indium/tin/suboxide thin film coating is transformed during said common thermal curing and firing process to a cured indium tin oxide transparent conductive coating suitable for use for a capacitive touch screen, and wherein said cured indium tin oxide transparent conductive coating has a sheet resistance of at least about 400 ohms per square and less than about 8000 ohms per square; and
   wherein said uncured conductive paste material is transformed during said common thermal curing and firing process to at least one cured conductive electrode suitable for use for a capacitive touch screen.

23. The method of claim 22, wherein curing said uncured conductive coating and said uncured conductive paste material via a common curing and firing process comprises curing by heating said substrate, said uncured conductive coating and said uncured conductive paste material to an elevated temperature via a common curing and firing process.

24. The method of claim 22, wherein coating an unheated surface of said substrate with an uncured conductive coating comprises depositing said uncured transparent conductive coating onto a substrate having a temperature of less than about 100 degrees Celsius.

25. The method of claim 22, further comprising:
   disposing at said unheated substrate surface an uncured hardcoat material over at least one of said uncured conductive coating and said uncured conductive paste material to establish a precursor of a protective hardcoat at least over at least one of said uncured conductive coating and said uncured conductive paste material; and
   heat curing said uncured hardcoat material to transform said uncured hardcoat material to a cured protective hardcoat suitable for use for a capacitive touch screen.

* * * * *